(12) United States Patent
Otten

(10) Patent No.: US 11,259,380 B2
(45) Date of Patent: Feb. 22, 2022

(54) LED LIGHT MEASUREMENT

(71) Applicant: EldoLAB Holding B.V., Son en Breugel (NL)

(72) Inventor: Andy Johanna Elisabeth Otten, Wassenberg (DE)

(73) Assignee: eldoLAB Holding B.V., Son en Breugel (NL)

( * ) Notice: Subject to any disclaimer, the term of this patent is extended or adjusted under 35 U.S.C. 154(b) by 0 days.

(21) Appl. No.: 16/975,653

(22) PCT Filed: Feb. 26, 2019

(86) PCT No.: PCT/NL2019/050123
§ 371 (c)(1),
(2) Date: Aug. 25, 2020

(87) PCT Pub. No.: WO2020/167112
PCT Pub. Date: Aug. 20, 2020

(65) Prior Publication Data
US 2020/0413507 A1    Dec. 31, 2020

(30) Foreign Application Priority Data
Feb. 26, 2018    (NL) ...................................... 2020494

(51) Int. Cl.
*H05B 45/22*    (2020.01)
*H05B 45/325*    (2020.01)
(Continued)

(52) U.S. Cl.
CPC ................ *H05B 45/22* (2020.01); *G01J 1/44* (2013.01); *H05B 45/28* (2020.01); *H05B 45/325* (2020.01);
(Continued)

(58) Field of Classification Search
None
See application file for complete search history.

(56) References Cited

U.S. PATENT DOCUMENTS 4,061,925 A    12/1977  van der Gaag et al.
9,247,605 B1 *  1/2016  Ho .......................... H05B 45/22
(Continued)

FOREIGN PATENT DOCUMENTS

EP    2428099 B1    7/2015
WO    2010068538 A1    6/2010
(Continued)

OTHER PUBLICATIONS

International Search Report for International Application No. PCT/NL2019/050123, dated Jun. 3, 2019, 4 pages.
(Continued)

*Primary Examiner* — Dedei K Hammond
(74) *Attorney, Agent, or Firm* — RatnerPrestia

(57) ABSTRACT

An LED light unit comprises an LED assembly and a light sensor to measure light emitted by the LED assembly and having a measurement range; a current source to drive the LED assembly at an LED current
A control device is configured to:
  pre-heat the LED assembly by driving the current source to operate the LED assembly at an operating current; the LED assembly thereby illuminating the light sensor at a light level above the measurement range;
  interrupt operating the LED assembly during a stray light measurement time; and read an output signal of the light sensor;
  operate the LED assembly at a measurement current, to emit light at a measurement level;
  subtract the output signal of the light sensor during the stray light measurement time from the output signal of
(Continued)

the light sensor during the light measurement time to obtain a stray light corrected light measurement signal; scale the stray light corrected light measurement signal by a scaling factor based on a ratio of the operating LED current and the measurement LED current to obtain a scaled operating current LED light output signal and derive an illumination of the light sensor therefrom.

12 Claims, 2 Drawing Sheets

(51) Int. Cl.
     *H05B 47/11*     (2020.01)
     *H05B 45/28*     (2020.01)
     *G01J 1/44*      (2006.01)
     *G01J 1/42*      (2006.01)

(52) U.S. Cl.
     CPC ...... *H05B 47/11* (2020.01); *G01J 2001/4252* (2013.01); *G01J 2001/444* (2013.01)

(56) References Cited

U.S. PATENT DOCUMENTS

| | | |
|---|---|---|
| 2007/0211013 A1 | 9/2007 | Uehara |
| 2014/0354150 A1 | 12/2014 | Joseph et al. |
| 2015/0382422 A1* | 12/2015 | Ho .................. H05B 45/20 |
| | | 315/151 |

FOREIGN PATENT DOCUMENTS

| | | |
|---|---|---|
| WO | 2011016860 A1 | 2/2011 |
| WO | 2015200615 A1 | 12/2015 |

OTHER PUBLICATIONS

Netherlands International Search Report and Written Opinion for International Application No. 2020494, dated Sep. 24, 2018, 12 pages.

* cited by examiner

LED LIGHT MEASUREMENT

RELATED APPLICATIONS

This application is a U.S. National Phase Patent Application of International Application No. PCT/NL2019/050123, filed Feb. 26, 2019, which claims priority to Netherlands Application No. NL 2020494, filed Feb. 26, 2018, the disclosures of which are incorporated herein by reference in their entirety for all purposes.

The invention relates to an LED light unit, an LED driver for use in such an LED light unit, and a method of driving an LED.

In LED lighting, it may be desired to measure a light output of an LED light unit in the presence of ambient light. Light output of a light unit may vary as a result of many factors, such as a piece to piece variation in LED conversion efficiency (i.e. light output (Lumens) per electrical power input (Watts)), a temperature dependency of LED conversion efficiency, a variation in geometry of light distribution, a variation in armature transmissibility, etc. U.S. Pat. No. 4,061,925 discloses a light measurement of light emitted by a light source, by means of a light sensor. The light sensor comprises a photodiode. An input of a transimpedance amplifier is connected to the photodiode in order to convert a photocurrent from the photodiode into a measurement voltage. The output of the transimpedance amplifier, hence the measurement voltage, is provided to an analogue to digital converter input of a processor. An ambient light is measured and the measurement of light including light emitted by the light source, is compensated for the ambient light measurement.

A problem associated with the prior art is that hardware is required in order to measure a light output of the LED light unit, such as a transimpedance amplifier.

The invention aims to provide a light unit that enables light measurement using only little additional hardware.

According to an aspect of the invention, there is provided an LED light unit comprising an LED assembly and a driver configured to drive the LED assembly, the LED driver comprising:

a light sensor configured to sense light emitted by the LED assembly, the light sensor having a measurement range and saturating when illuminated at a light level above the measurement range;

a current source to drive the LED assembly, a control device having a measurement input connected to the light sensor and having a driving output connected to a control input of the current source, wherein the control device is configured to:

a) drive the current source to provide an operating current to the LED assembly during a temperature stabilizing time, to provide that the LED assembly reaches an operating temperature associated with the operating current;

b) interrupt operating the current source during a stray light measurement time;

c) read an output signal of the light sensor during the stray light measurement time;

d) drive the current source to provide a measurement current to the LED assembly, to emit light at a measurement level, the LED assembly thereby illuminating the light sensor at a light level in the measurement range of the light sensor;

e) read an output signal of the light sensor during the light measurement time;

f) subtract the output signal of the light sensor during the stray light measurement time from the output signal of the light sensor during the light measurement time to obtain a stray light corrected light measurement signal;

g) scale the stray light corrected light measurement signal by a scaling factor based on a ratio of the operating current and the measurement current to obtain a scaled light measurement signal; and h) derive an illumination of the light sensor at the operating current from the scaled light measurement signal.

In an embodiment, the measurement current has a predetermined value and wherein the scaling the stray light corrected light measurement signal by the scaling factor provides for the illumination of the light sensor at the operating current and operating temperature associated with the operating current.

The LED light unit forms a light unit for illumination and comprises an LED assembly that comprises at least one LED (Light Emitting Diode) and an LED driver to drive the LED assembly. The driver thus provides electrical power to the LED assembly and controls the LED assembly so as to operate as desired (e.g. at a desired intensity, colour, etc.). The driver comprises a current source, such as a switched mode current source or a linear current source, to provide an LED current to the LEDs of the LED assembly. The LED current may be a constant (DC) current or a pulsed current, such as a pulse width modulated current. The driver further comprises a light sensor, such as a photodiode, a phototransistor, a photo Darlington transistor, a photo thyristor, or any other suitable light sensor. The light sensor may comprise any photo junction device, such as the above mentioned photodiode, phototransistor, etc. Other types of light sensor may be employed, such as a photomultiplier tube. The light sensor, e.g. the photodiode, is arranged to sense light as emitted by the LED assembly. The light sensor may be positioned in a field of illumination of the LED assembly. As another example, an optical device, such as a light guide (e.g. a fibre optic guide), a lens, a mirror, etc. may be arranged in the field of illumination of the LED assembly, whereby optical device guides some of the light from the LED assembly to the light sensor. The driver further comprises a control device, such as a microcontroller or microprocessor. The control device is connected to the light sensor via a measurement input of the control device. The measurement input may for example be formed by an analogue input of the control device, such as an analogue to digital converter input. The measurement input may be configured to receive an input voltage representative of a value of signal, the control device being configured to convert the input voltage into a digital value by means of its analogue to digital converter. The light sensor on its own or the light sensor combined with a measurement range of the measurement input may provide for a measurement range up to a saturation level, i.e. a level where an relation between an increment in light provided to the light sensor results in a reduced increment or no increment of a measurement value at the control device. In other words, the saturation level represents a level at which the light sensing by the light sensor combined with the measurement input of the control device starts to show signs of clipping, maximization, or similar.

A control input of the current source is connected to a driving output of the control device. The control device is thereby enabled to control the current as provided by the current source by means of providing an (analogue or digital) control signal to the control input of the current source. The control device may thereby for example set the value of the LED current as generated by the current source, or may control a duty cycling thereof, for example in the case of a pulsed LED current being generated by the current source.

In operation, the control device first operates the current source to generate an operating current. The operating current is provided to the LED assembly for operation of the LED assembly at the operating current. The operating current is applied to the LED assembly during a time period which is at least equal to a temperature stabilisation time, i.e. a time required for the LED assembly to stabilize at an operating temperature that is associated with the operating current, thus to reach a temperature equilibrium.

The operating current provides for an illumination by the LED assembly which results in a level of illumination at the light sensor which may exceed the saturation level. Thus, the operating current may provide for an illumination which is above a measurement range of the light sensor, i.e. may exceed a maximum of the measurement range of the light sensor. In case the light sensor is saturated, time may be required for the sensor to come from a saturated region into an active region, causing some delay before a measurement may take place. A photodiode may restore quickly from such saturation, rendering a photodiode to be suitable in such an application.

According to the invention, the operating of the current source to generate the operating current is halted after the LED assembly reaches its associated operating temperature. Then, two measurements are performed, while the LED assembly substantially remains at the operating temperature associated with the operating current. During a first measurement, stray light, e.g. ambient light, as well as dark current generated by the light sensor, is measured. Thereto, the control device drives the LED assembly to operate at zero current, i.e. inhibits driving the LED assembly. Accordingly, light sensor, generates a signal that is received and processed by the control device as a signal representative of stray light and/or dark current.

The second measurement is performed while operating the LED assembly at a measurement current. The measurement current provides for an illumination level on the light sensor which is lower than the illumination level provided onto the light sensor when operating the LED assembly at the operating current. The measurement current provides for an illumination level of the light sensor which is within the measurement range of the light sensor, i.e. an illumination level which is below the saturation level of the light sensor. Accordingly, light sensor, when illuminated, generates a signal that is received and processed by the control device as a result of the illumination by the LED assembly while being driven at the measurement current.

The first and second measurement may be performed in either order. They may be performed one directly after the other so as to provide that the stray current/dark current measurement forms a more accurate representation of the stray current/dark current during the second measurement, in case the stray current/dark current would tend to change over time. Alternatively, the operating current may be applied in between the first and second measurements to get the LED assembly back to the operating temperature in case it would have cooled down to some extent. The first and/or second measurements as described above may be performed one time or repetitively. Repetitive measurements combined with e.g. averaging may assist to cope with a ripple as a result of a periodicity in stray light, such as a mains frequency ripple in the stray light.

The control device then subtracts the signal as obtained during the first measurement from the signal as obtained during the second measurement to correct for stray light and/or dark current, thereby obtaining a stray light corrected light measurement signal.

The thus corrected signal is scaled to a value representative of light at the operating current by multiplying the corrected signal by a quotient of the operating current divided by the measurement current, thereby obtaining a scaled light measurement signal. An illumination of the light sensor at the operating current is derived from the scaled light measurement signal.

Hence, even though the operating current is outside a measurement range of the light sensor and/or the measurement input of the control device, an accurate determination of the light output may be performed. As the LED assembly is pre-heated to the operating temperature associated with the operating current, dark current generated by the light sensor as a result of heat irradiated by the LED assembly onto the light sensor (if applicable) may be taken into account and corrected for by the subtraction. Likewise, light output efficiency of the LED assembly may exhibit a temperature effect: for example, the higher the temperature of the LED assembly, the lower a light output efficiency may be. This temperature effect may be taken into account in that the LED assembly is pre-heated to the operating temperature.

Furthermore, the measurement as described above may allow to make use of relatively low complexity hardware to perform the light measurement. For example, as the light intensity is reduced compared to the light intensity associated with the operating current, a lower power light sensor may be applied. As another example, a transimpedance amplifier that would have been required in order to convert a relatively large photocurrent into a voltage, may be omitted. Instead, use may for example be made of a resistor in parallel connection or in series connection to the photodiode (light sensor), the resistor to convert the photocurrent provided by the light sensor into a voltage.

The measurement current may have a predetermined value which may be set to provide the LED assembly to emit light at a level which irradiates the light sensor at a level in the measurement range of the light sensor. The predetermined value of the measurement current may be independent from an actual value of the operating current. The measurement range, i.e. dynamic range of the light sensor may be relatively limited, for example using a relatively simple sensing circuit (photodetector and electronics), while the scaling by the scaling factor provides for the illumination of the light sensor at the operating current and operating temperature associated with the operating current: thus even with operating currents and associated operating temperatures well outside a measurement range of the light sensor, an accurate determination of the light output may be provided. As the LED assembly may be operated at the operating current for a time which is longer than the operating at the measurement current, the LED assembly may remain substantially at the operating temperature associated with the operating current. Thus, the scaling as described may take temperature effects into account. The measurement current may be set at a value to be in a measurement range of the photo sensor. For example, the measurement current may be set sufficiently high to provide a high resolution readout by the photo sensor, i.e. a sufficient multiple of a minimum resolution of the photo sensor and readout electronics.

The LED assembly may comprise plural LEDs, for example having a same colour or having different colours. The above process of measurement of the light output of the LED assembly may similarly be applied to a single of the LEDs of the LED assembly. Differences in optical coupling, colour, etc. may reflect into an output signal of the optical sensor, and may be addressed as described below.

A sensitivity of the photo sensor may differ for various wavelengths, i.e. for different colour LEDs. Calibration factors may take such differences into account. Alternatively, a spectral response curve of the photo sensor may be flattened, e.g. by a colour filter.

As a further alternative, the value of the measurement current may differ per LED colour. Thus, depending on the colour of the LED as subject to the measurement, a value of the measurement current is set. Hence, a relative reduction/increase in sensitivity of the photo sensor according to the spectral responsivity curve may be offset by a corresponding increase/reduction of the measurement current. Furthermore, for different ones of the LEDs, an optical coupling between the LED and the photo sensor may be different translating into differences in sensor output. Also in this case, different values of the measurement current may be applied to at least party compensate for the differences in optical coupling. Thus, depending on the LED as subject to the measurement, a value of the measurement current may be set to e.g. offset an increase or decrease in optical coupling from the respective LED to the photo sensor by a corresponding decrease or increase of the measurement current. Thus, various predetermined values of the measurement current may be set by the control device. Per LED, a value of the measurement current associated with that LED may be set, the value of the LED current to at least partly compensate for a variation in a response of the light sensor to the different LEDs, i.e. a variation in sensitivity of the light sensor (e.g. including the coupling) as a result of colour, optical path from the LED to the light sensor, etc.

In an embodiment, the control device is configured to drive the LEDs using a pulse width modulation scheme, the light measurement time and the stray light measurement time being embedded in the pulse width modulation scheme. Thus, the operating current may be provided to the LEDs in the form of pulse width modulation, so as to provide that the LEDs operate at or near desired intensities. The pulse width modulation, i.e. the pulse width modulation scheme, may be provided by modulating the current from the current source, or by switches, such as parallel switches in parallel to groups of the LED, resulting in a by-passing of LEDs when the switch is set to a conductive state. The pulse width modulation may further be provided by a combination of modulating the current from the current source and switching of the switches (e.g. the parallel switches) to activate resp. de-activate LED groups.

The control device may be configured to modulate the LEDs in a modulation cycle time, the light measurement time and the stray light measurement time being shorter than the modulation cycle time. The modulation cycle time forms a cycle over which a desired average intensity is achieved. Thus, the control device may repeat the pulse width modulation scheme per modulation cycle time. The modulation cycles may commonly span time periods which are shorter than a reaction time of a human eye, so that the modulation is observed by a human observer as a stable, i.e. non-flickering illumination. As the modulation cycle will commonly include time parts where an LED is de-activated, such time part may be applied for the stray light measurement, thus enabling to perform the stray light measurement during normal operation. Likewise, the modulation cycle may be set to include a time period during which the LEDs are operated at an intensity suitable for light measurement, as a result enabling to perform the light measurement during normal operation. The light measurement may for example be performed by setting the current of the current source to a suitable level, whereby some correction in a remainder of the modulation cycle may be required in order to achieve the desired average of intensity over the modulation cycle.

The LEDs may be arranged in groups, and the control device may be configured to drive the LEDs at the measurement current per group, and the control device may be configured to perform steps d-h per group.

The LEDs may comprise LEDs of different groups, e.g. each group having a different colour. The LED colours may for example comprise red green blue and/or white. By modulating the red, green, blue and white LEDs, colours may be mixed as desired. The white LEDs may for example comprise cool white and/or warm white so as to mix to a desired colour temperature by modulating these LEDs. Each Led, and hence each group of LEDs, may show a tolerance in the conversion efficiency of converting electrical energy into light. Hence, a total light output in terms of intensity and/or colour may show a tolerance.

In order to be able to measure a light output per colour, the LED groups may be activated one by one, whereby the measurement of the light output is performed by the sensor when that particular group has been switched on. Likewise, the steps of reading out, subtracting, scaling, etc. are performed per group. Hence, using one sensor, each group may be measured at different moments in time. The activation of the groups, one by one, and corresponding measurement may be performed within one modulation cycle time, or in different, e.g. following cycle times. Enforcing a correct measurement condition may necessitate compensation in a remainder of the modulation cycle, e.g. prior to or after the part(s) of the modulation cycle where the measurement conditions prevail, in order to achieve the average current in each LED as required to match the overall light output to the intensity and/or colour setpoint. The control device may vary the value of the measurement current per LED or LED group, according to the principles as described above.

The control device may be configured to calibrate an illumination level of each of the groups based on a comparison of a desired light output at the operating current and the illumination of the light sensor at the operating current as derived from the scaled light measurement signal. Hence, the level of illumination (e.g. intensity and/or colour) as derived from the light measurement, may be compared to a desired level of illumination (e.g. intensity and/or colour). Thereby, tolerances in the light output of the LEDs, e.g. as a result of tolerances in light emission efficiency, etc. may at least partly be compensated by adjustment of the operating current, such as adjustment of the LED current level or adjustment of the pulse width modulation or both. Thus, in case the LED groups each emit a different colour, tolerances in colour and/or intensity may be at least partly compensated. Thus, a feedback may be provided whereby, in the modulation scheme, the stray light measurement and the light emission measurement of each one of the LED groups, is integrated, and calculating offsets and scaling as described, a light output (colour and/or intensity) is calculated. The light output may be compared to a setpoint (intensity and/or colour) and the driving of the LED groups may be adapted accordingly so as to provide that any tolerances in the light output (intensity and/or colour) may be reduced.

In an embodiment, the measurement current is lower than the operating current, which may enable to make use of relatively simple hardware. For example, an amplifier, such as a transimpedance amplifier, may be omitted. The light sensor may be connected to the control device using simple circuitry. For example, the light sensor may be connected to a resistor in order to convert a photocurrent into a voltage. The voltage may be input to e.g. an analogue to digital converter of the control device, so as to enable the control device to measure the light as sensed using little additional electrical components. Similarly, a low dynamic range light sensor may be applied enabling use of a relatively low spec. light sensor (including readout electronics, such as photo-current to voltage conversion, etc.). For example, the operating current provides the LED assembly to illuminate the light sensor at a light level above the measurement range of the light sensor to saturate the light sensor.

In an embodiment, the control device is further configured to determine the measurement current by adjusting the LED current until the LED current results in an output signal of the light sensor which is in the measurement range.

Hence, gain control of the light sensor and/or associated read out such as a transimpedance amplifier) so as to take account of different levels of light to be measured, may be omitted, as the measurement current is scaled relative to the operating current so as to be in a range which provides an output signal of the light sensor that can be processed as being within a range of the light sensor and/or measurement input of the control device. Likewise, a switching between different values of parallel or series resistors of the light sensor (e.g. photodiode) may be omitted. This may be at the expense of some resolution, however resolution may suffice in many applications.

The adjusting may be performed one time, e.g. by calculation of an expected light intensity on the light sensor. Alternatively, in order to take account of variations, disturbances, optical layout, optical transmission, and other factors that may affect a signal received by the light sensor, the adjusting may be performed repetitively until the output signal of the light sensor is in the measurement range.

In an embodiment, the light sensor comprises a photodiode and a parallel resistor connected in parallel to the photodiode to convert a photocurrent generated by the photodiode into an output voltage. Hence, a transimpedance amplifier may be omitted, and, despite a relatively low dynamic range of such an arrangement (a low light level may result in a low signal to noise ratio while a high light level will result in a voltage over the photodiode which may affect a linearity thereof) a high dynamic range of light may be measured as the measurement current may be scaled down to an appropriate value to be within the measurement range.

In order to keep the temperature of the LED assembly at the operating temperature during measurement and/or stray light measurement, stray light measurement time and/or the light measurement time may be shorter than the time required to stabilize the temperature of the LED assembly at the operating temperature associated with the operating current.

Adjustment of the light level in case of a deviation from a desired light level may be performed in that the control device may be further configured to:
 compare the scaled light measurement signal to an LED set point signal, and
 adjusting the operating current based on the comparison.

According to another aspect of the invention, there is provided an LED driver for use in an LED light unit according to the invention.

According to yet another aspect of the invention, there is provided a method of operating a light unit comprising an LED assembly and a driver configured to drive the LED assembly, the LED driver comprising:
 a light sensor configured to sense light emitted by the LED assembly, the light sensor having a measurement range and saturating when illuminated at a light level above the measurement range; and
 a current source to drive the LED assembly at an LED current,
 the method comprising:
 driving the current source to provide an operating current to the LED assembly during a temperature stabilizing time, to provide that the LED assembly reaches an operating temperature associated with the operating current; the LED assembly thereby illuminating the light sensor at a light level above the measurement range of the light sensor to saturate the light sensor;
 interrupting operating the current source during a stray light measurement time;
 reading an output signal of the light sensor during the stray light measurement time;
 driving the current source to provide a measurement current to the LED assembly, to emit light at a measurement level, the LED assembly thereby illuminating the light sensor at a light level in the measurement range of the light sensor;
 reading an output signal of the light sensor during the light measurement time;
 subtracting the output signal of the light sensor during the stray light measurement time from the output signal of the light sensor during the light measurement time to obtain a stray light corrected light measurement signal;
 scaling the stray light corrected light measurement signal by a scaling factor based on a ratio of the operating current and the measurement current to obtain a scaled light measurement signal; and
 deriving an illumination of the light sensor at the operating current from the scaled light measurement signal.

Preferably, the measurement current has a predetermined value and wherein the scaling the stray light corrected light measurement signal by the scaling factor provides for the illumination of the light sensor at the operating current and operating temperature associated with the operating current.

With the method according to the invention, the same or similar effects may be achieved as with the LED light unit according to the invention. Likewise, the same or similar embodiments may be provided as described with reference to the LED light unit according to the invention, achieving the same or similar effects.

Further embodiments, effects and features of the invention will follow from the appended drawing, in which a non-limiting embodiment is depicted, wherein.

Figure 1:
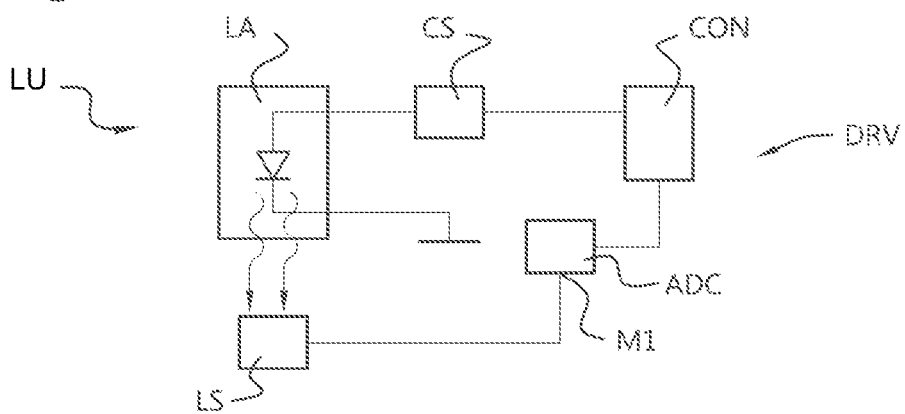
FIG. 1 depicts a schematic view of a LED light unit according to an embodiment of the invention.

FIG. 1 depicts an LED light unit LU comprising an LED assembly LA having at least one LED. The LED assembly may for example comprise white light LEDs or LEDs having different colours, such as red, green and blue, which are operable to be mixed to generate white light or to generate light at a desired colour. A current source, CS, such as a switched mode current source or a linear current source is connected to the LED assembly in order to provide an LED current to the LED assembly. The LEDs may be addressable (operable) simultaneously or may be addressable in groups and/or pulsed so as to generate a desired intensity, colour, etc. The LEDs may for example be provided with parallel switches, so that a conducting of the parallel switch provides the respective LED to be switched off. Alternatively, each group of the LEDs may be separately powered, either by a switch that connects the group of LEDs to the current source, or by providing respective current sources per group.

The current source CS forms part of a driver DRV. The driver comprises a controller CON, such as a microcontroller, microprocessor, programmable integrated controller, or other programmable device. The controller is connected to the current source in order to drive the current source. For example, the controller may set an LED current level of the current source and/or a pulse modulation thereof. The controller may for example drive a setpoint input of the current source, the signal at the setpoint input determining a current level as provided by the current source. As another example, the current source is driven in a pulse width modulation scheme, the controller driving the setpoint input of the current source to provide that the current source operates in a pulse width modulation. The controller may for example control a timing of the signal at the set-point input to determine the pulse modulation.

The light unit further comprises a light sensor LS such as a photodiode. The light sensor is arranged to measure light as emitted by the LED light assembly. For example, a fraction of the light as emitted by the LED light assembly may be guided to the light sensor by means of a reflective mirror, or by a light guide. Alternatively, the light sensor may be arranged in a field of illumination, i.e. in an area that is illuminated by the light unit. The light sensor is connected to a measurement input of the driver, such as an analogue to digital converter input which converts an analogue measurement signal from the light sensor into a digital signal to be processed by the controller. The light sensor may for example comprise a photodiode, such as a PIN diode. The photodiode may be equipped with a parallel or series resistor in order to convert a photocurrent as generated by the photodiode into a voltage.

Figure 2:
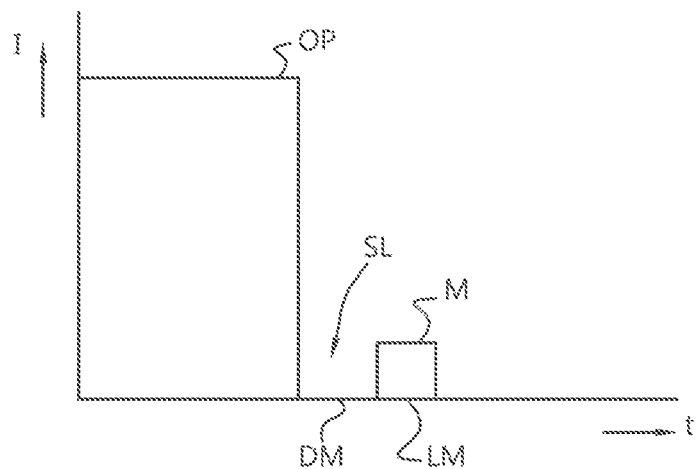
FIG. 2 depicts a time diagram of operating the LED light unit according to FIG. 1.

An operation of the LED light unit as described with reference to FIG. 1, will be described with reference to FIG. 2. FIG. 2 depicts a current I as generated by the current source along a vertical axis and time t along a horizontal axis.

First, the controller drives the current source to operate at an operating current OP. The operating at the operating current provides for a heating of the LED assembly to reach an operating temperature associated with the operating current. The operating current is applied during an operating time which is longer than, or at least substantially the same as, a temperature stabilizing time of the LED assembly to enable the LED assembly to reach the operating temperature associated with the operating current. The operating current provides for a level of illumination by the LED assembly which causes an incidence of light onto the light sensor above the measurement range of the light sensor.

When the operating temperature has substantially been reached, the control device performs two actions in order to perform two measurements as follows:

The control device interrupts the operation of the LED assembly during a stray light SL measurement time and reads an output signal of the light sensor during the stray light measurement time DM. Hence, a readout is obtained which is representative of a value of dark current (i.e. photodiode current at zero incident light), stray light, and possible further causes of offset, such as offset of readout electronics.

Further, the control device operates the LED assembly at a measurement current, the measurement current being lower than the operating current, to emit light at a measurement level M. The LED assembly thereby illuminates the light sensor at a light level in the measurement range of the light sensor and reads an output signal of the light sensor during the light measurement time LM.

Having performed these two measurements, the control device subtracts (by a subtracting device, such as a software implemented subtracting device executed by the control device) the output signal of the light sensor during the stray light measurement time from the output signal of the light sensor during the light measurement time to obtain a stray light corrected light measurement signal. Then, the control device scales (by a scaling device, such as a software implemented scaling device executed by the control device) the stray light corrected light measurement signal by a scaling factor based on a ratio of the operating LED current and the measurement LED current to obtain a scaled LED light output signal. The thus scaled LED light output signal represents a light measurement at the operating current.

Thus, despite the light sensor and measurement input circuitry of the control device only having a limited measurement range, higher intensities can be measured by the scaling as described. High dynamic range readout electronics, such as a transimpedance amplifier or a programmable gain transimpedance amplifier, may be omitted. The scaling factor may be pre-set or may be estimated from a level of the operating current. Furthermore, the scaling factor may be set based on a measurement of the LEDs of the assembly during factory calibration, during installation or during an initialization or start-up procedure. Alternatively, the control device may adjust the measurement current upwards or downwards until the signal from the photodiode (light sensor) gets in the measurement range. A measurement current thus determined may be stored by the control device. Thus, a low dynamic range of the measurement range may be accommodated by the adjustment of the measurement current.

The stray light measurement time and the light measurement time may extend over a short time period in respect of the thermal time constant of the LED assembly, thus providing that the LED assembly remains at the operating temperature during the stray light measurement and the light measurement, hence to provide that these measurements are representative of the LED assembly at the operating temperature. Accuracy may benefit, as photodiode dark current and LED conversion efficiency may be temperature dependent.

Figure 3:
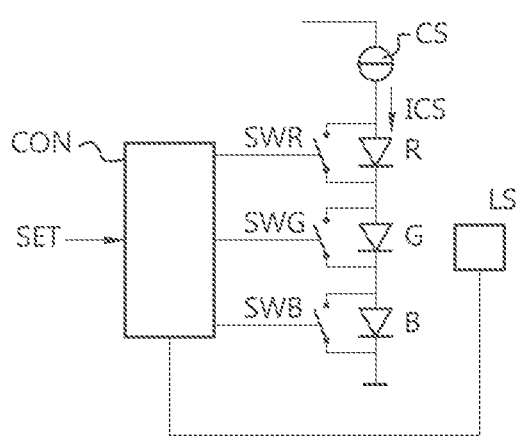
FIG. 3 depicts a schematic view of a LED light unit according to another embodiment of the invention.

FIG. 3 depicts a circuit in which aspects of the invention may be applied. The circuit comprises Red, R, green G, and blue B LEDs configured to emit light having the respective colour. The red green and blue LEDs may be mixed in order to generate a desired colour of illumination. The mixing may be performed using pulse width modulation as will be explained below with reference to FIG. 4. The circuit further comprises a current source CS which generates an LED current ICS. The red, green and blue LEDs are series connected so that each of the LEDs may be operated using the LED current. Each of the red, green and blue LEDs is provided with a parallel switch SWR, SWG and SWB respectively, such as parallel connected field effect transistors. Closing the switch to a conductive state will bypass the LED current via the switch, thus setting the respective LED to an off state. The switches are driven by control device CON, likewise to the current source being controlled by the control device, enabling to bypass each one of the LEDs as desired and enabling to drive the current source to provide an operating current (pulsed or continuous) as desired and to set a current level of the current source to a level as desired. FIG. 3 further depicts a light sensor, the light sensor LS may be arranged to sense the light emitted by the LEDs. It will be understood that, instead of making use of a single LED per group, i.e. a single LED for red, green and blue groups, plural LEDs may be applied per group.

Figure 4:
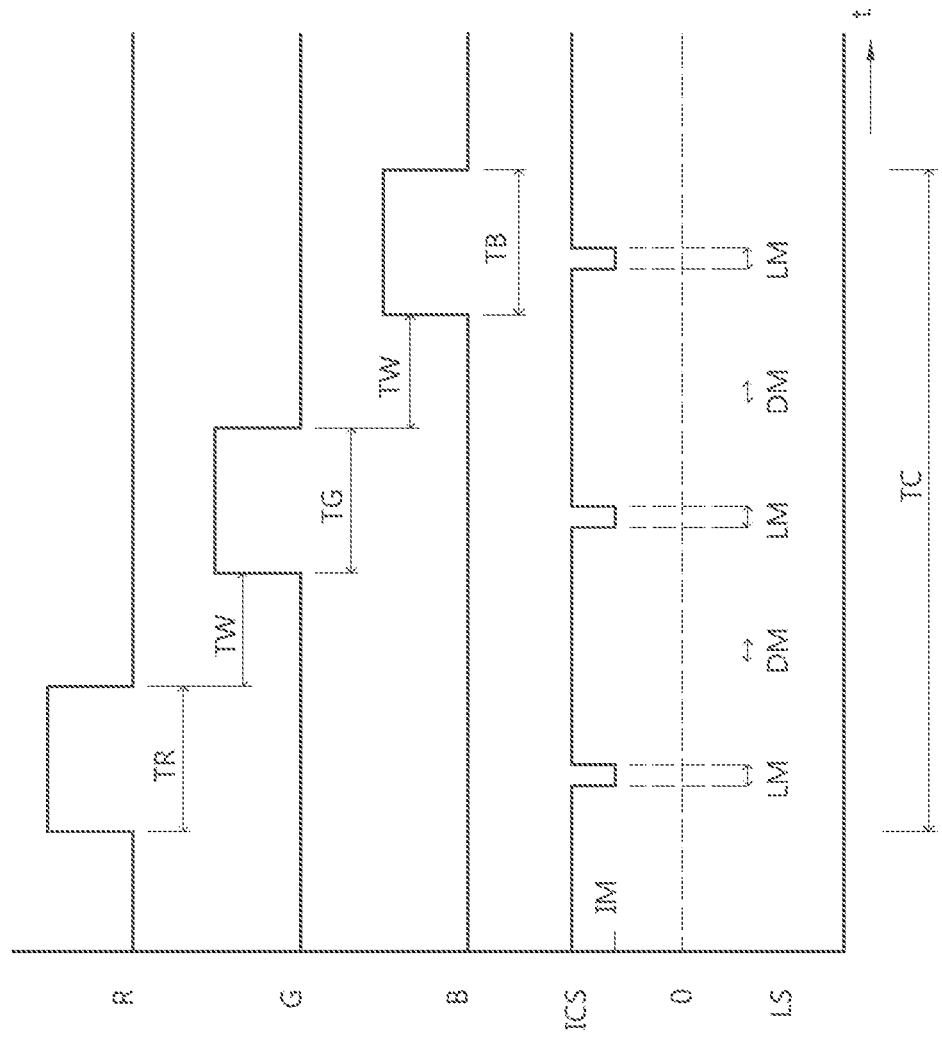
FIG. 4 depicts a time diagram of operating the LED light unit according to FIG. 3.

The FIG. 4 shows a time diagram depicting a highly schematic example of a modulation scheme as applied by the circuit in accordance with FIG. 3. FIG. 3 depicts a modulation time cycle TC. In the modulation time cycle, the red, green and blue LED are pulsed so as to provide an average illumination in accordance with a setpoint as provided to the control device. In the present example, the red, green and blue LEDs are activated one by one, each in a respective time cycle part TR, TG, TB. The red, green and blue LEDs are activated and de-activated by corresponding actions of the parallel switches. A wait time TW is provided between successive switching actions, thus providing that the current source needs to accommodate the load change of the activation/de-activation of one LED group at a time, the wait time allowing the current source to stabilise to the changed load condition, i.e. the changed load voltage over the LEDs.

The control device senses a stray light during at least one of the time periods DM when none of the LED groups is active, i.e. in the present example between the de-activation of one group and the activation of the next group. As these time periods may be present in the modulation scheme anyhow, no additional actions are required and no time/resolution may be lost in the modulation scheme. The stray light measurement DM may be employed to measure a sum of (ambient) stray light and dark current from the light sensor. During the activation of each group R, G, B, the control device measures, using the light sensor LS, the light as generated by the respective group in a light measurement time LM. The control device may, during the light measurement time LM, i.e. in the present example during a part of the time when the respective LED group is activated, set the current source to generate a current at a level which provides that the light sensor is in its operating range. For example, the current may be reduced, as depicted in FIG. 4, depicting an example whereby in a part of the operation of each group R, G, B, the current ICS from the current source CS is set to a lower level IM.

Although in the present example, the pulse width modulation is performed by activation and deactivation of each of the groups over time, it will be understood that further possibilities for pulse width modulation may also be employed, for example modulating the current of the current source.

The control device, having measured the stray light (incl. dark current), as well as the illumination for red, green and blue, may correct the readings of red, green and blue for the stray light, scale the readings to take account of the changed (in this example lower) current. The resulting values of the light as measured for each of the groups may be compared by the control device to levels as would be desired per group, and the control device may adjust the pulse width modulation scheme accordingly. For example, in case it would appear that the illumination level of red is brighter than expected while blue is less bright than expected, the control device may reduce, in the pulse with modulation cycle times, the on time of red accordingly to correct for the increased brightness, while the on time of blue is is increased to correct for the lower brightness.

Accordingly, inaccuracy in the light emission of the LED groups, for example due to temperature effects, part to part tolerances, aging, or any other reason, may be counteracted, enabling to increase an accuracy of the irradiation, in terms of intensity, colour or both. It will be understood that the LEDs will be brought to a stable operating temperature prior to performing the measurements, as LED efficiency may exhibit a temperature dependency. Accordingly, the bringing the LEDs to the stable operating temperature may be performed using a same or similar pulse width modulation scheme as employed during the measurements. Thereby, it may be provided that each of the groups is brought at an operating temperature in accordance with the intensity/power at which that group is driven, allowing to perform the measurements of all groups at thermal conditions largely corresponding to the operational temperatures.

Accordingly, in case the driving of the LEDs is changed during operation towards a different intensity level or a different colour, the calibration as described above may be repeated, in order to take account of different operating temperatures associated with different intensities of the groups. The measurements may then be performed after a temperature stabilisation has taken place, i.e. after the LEDs have operated at such level during a temperature stabilisation time. Per LED, the same, e.g. predetermined measurement current may be applied. In the case of the different LEDs, the control device, may be configured to set the measurement current to a respective predetermined value per LED or LED group. The resulting variation in values of the LED current may at least partly compensate for a variation in a response of the light sensor to the different LEDs, i.e. a variation in sensitivity of the light sensor (e.g. including the coupling) as a result of colour, optical path of the LED, etc.

The calibration, such as the calibration as described above, may be performed once at a taking into operation of the driver to take account of tolerances in the LEDs, may be performed upon each change in the configuration to learn what LEDs are connected to the driver, may be performed periodically to take account of aging, etc., may be performed at each change of intensity to take account of temperature effects, etc.

Instead of the single light sensor that is common for all groups, different light sensors may be employed, e.g. one per group, such as sensors each being provided with a respective colour filter, such as a red, green and blue colour filter. Thereby, the measurements of the groups may be performed at the same time, at the expense of extra hardware.

Although in the above, the light sources are referred to as LEDs, it will be understood that the same principle may be employed with any fast acting light source. Thus, where in the present document the term LED is employed, this may be understood so as to comprise any fast acting light source.

The invention claimed is:

1. An LED light unit comprising an LED assembly and a driver configured to drive the LED assembly, the driver comprising:

a light sensor configured to sense light emitted by the LED assembly, the light sensor having a measurement range and saturating when illuminated at a light level above the measurement range;

a current source to drive the LED assembly, a control device having a measurement input connected to the light sensor and having a driving output connected to a control input of the current source, wherein the control device is configured to:
  a) drive the current source to provide an operating current to the LED assembly during a temperature stabilizing time, to provide that the LED assembly reaches an operating temperature associated with the operating current;
  b) interrupt operating the current source during a stray light measurement time;
  c) read an output signal of the light sensor during the stray light measurement time;
  d) drive the current source to provide a measurement current to the LED assembly, to emit light at a measurement level, the LED assembly thereby illuminating the light sensor at a light level in the measurement range of the light sensor;
  e) read an output signal of the light sensor during the light measurement time;
  f) subtract the output signal of the light sensor during the stray light measurement time from the output signal of the light sensor during the light measurement time to obtain a stray light corrected light measurement signal;
  g) scale the stray light corrected light measurement signal by a scaling factor based on a ratio of the operating current and the measurement current to obtain a scaled light measurement signal; and
  h) derive an illumination of the light sensor at the operating current from the scaled light measurement signal, wherein c) and e) are performed while the LED assembly has been heated to the operating temperature associated with the operating current, wherein the measurement current has a predetermined value, wherein the measurement current as provided to the LED assembly to emit light at the measurement level, is lower than the operating current as provided to the LED assembly during the temperature stabilizing time, and wherein the scaling the stray light corrected light measurement signal by the scaling factor provides for the illumination of the light sensor at the operating current and operating temperature associated with the operating current.

2. The LED light unit according to claim 1, wherein the control device is configured to drive the LEDs using a pulse width modulation scheme, the light measurement time and the stray light measurement time being embedded in the pulse width modulation scheme.

3. The LED light unit according to claim 2, wherein the control device is configured to modulate the LEDs in a modulation cycle time, the light measurement time and the stray light measurement time being shorter than the modulation cycle time.

4. The LED light unit according to claim 2, wherein the LEDs are arranged in groups, and wherein the control device is configured to drive the LEDs at the measurement current per group, and wherein the control device is configured to perform steps d-h per group.

5. The LED light unit according to claim 4, wherein the control device is configured to calibrate an illumination level of each of the groups based on a comparison of a desired light output at the operating current and the illumination of the light sensor at the operating current as derived from the scaled light measurement signal.

6. The LED light unit according to claim 4, wherein the control device is configured to set the measurement current to a respective predetermined value per LED or LED group, a variation in the value of the measurement current to at least partly compensate for a variation in a response of the light sensor to the LEDs.

7. The LED light unit according to claim 1, wherein the operating current provides the LED assembly to illuminate the light sensor at a light level above the measurement range of the light sensor to saturate the light sensor.

8. The LED light unit according to claim 1, wherein the control device is further configured to determine the measurement current by adjusting the LED current until the LED current results in an output signal of the light sensor which is in the measurement range.

9. The LED light unit according to claim 1, wherein the light sensor comprises a photodiode and a resistor connected to the photodiode to convert a photocurrent generated by the photodiode into an output voltage.

10. The LED light unit according to claim 1, wherein the light sensor comprises a photodiode, which is connected to the measurement input without the interposition of a transimpedance amplifier.

11. The driver for use in an LED light unit according to claim 1.

12. A method of operating a light unit comprising an LED assembly and a driver configured to drive the LED assembly, the driver comprising:
  a light sensor configured to sense light emitted by the LED assembly, the light sensor having a measurement range and saturating when illuminated at a light level above the measurement range; and
  a current source to drive the LED assembly at an LED current,
the method comprising:
  a) driving the current source to provide an operating current to the LED assembly during a temperature stabilizing time, to provide that the LED assembly reaches an operating temperature associated with the operating current;
  b) interrupting operating the current source during a stray light measurement time;
  c) reading an output signal of the light sensor during the stray light measurement time;
  d) driving the current source to provide a measurement current to the LED assembly, to emit light at a measurement level, the LED assembly thereby illuminating the light sensor at a light level in the measurement range of the light sensor;
  e) reading an output signal of the light sensor during the light measurement time;
  f) subtracting the output signal of the light sensor during the stray light measurement time from the output signal of the light sensor during the light measurement time to obtain a stray light corrected light measurement signal;
  g) scaling the stray light corrected light measurement signal by a scaling factor based on a ratio of the operating current and the measurement current to obtain a scaled light measurement signal; and
  h) deriving an illumination of the light sensor at the operating current from the scaled light measurement signal, wherein c) and e) are performed while the LED assembly has been heated to the operating temperature associated with the operating current, wherein the measurement current has a predetermined value, wherein the measurement current as provided to the LED assembly to emit light at the measurement level, is lower than the operating current as provided to the LED assembly during the temperature stabilizing time, and wherein the scaling the stray light corrected light measurement signal by the scaling factor provides for the illumination of the light sensor at the operating current and operating temperature associated with the operating current.

\* \* \* \* \*